Patented Nov. 13, 1934

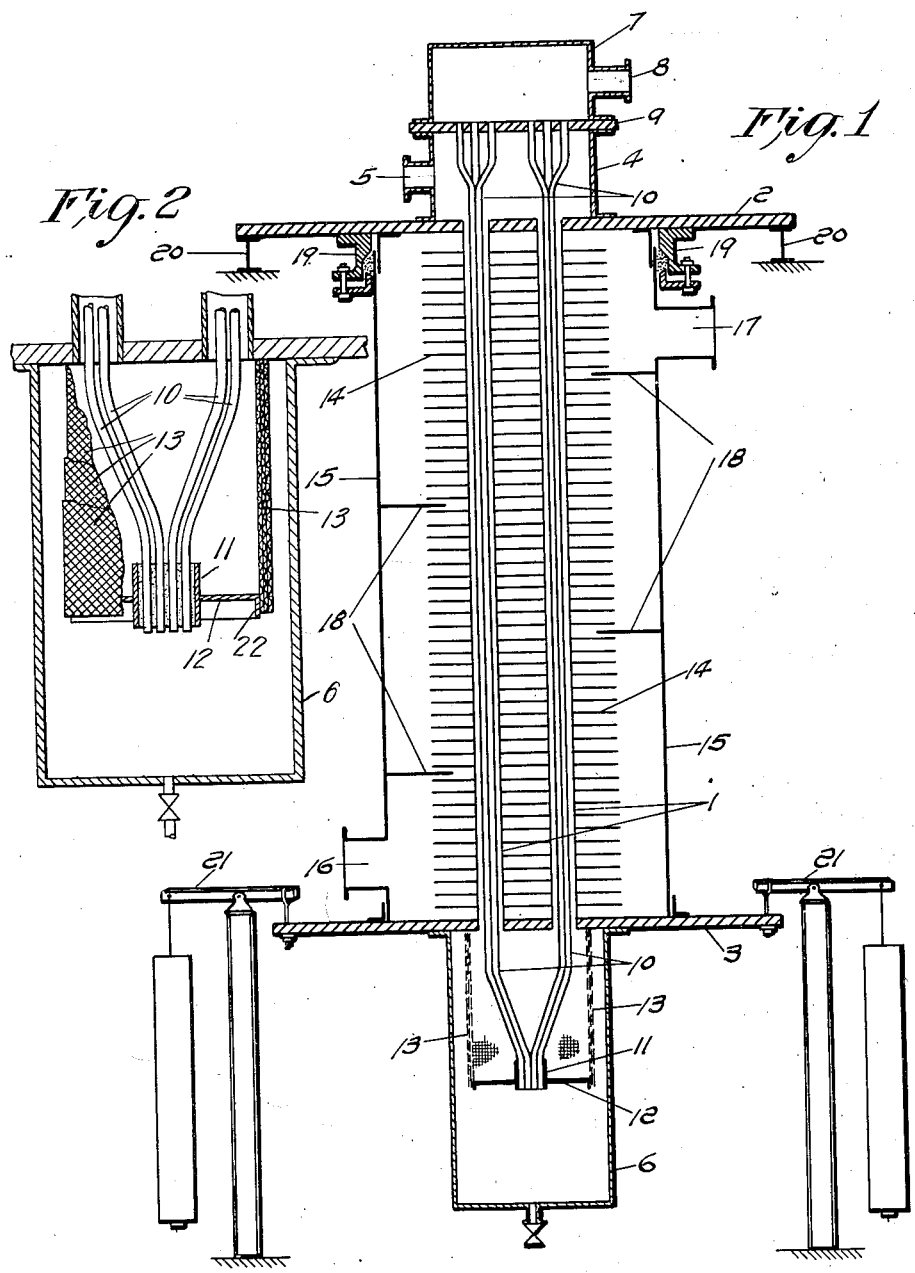

1,980,791

UNITED STATES PATENT OFFICE 1,980,791

APPARATUS FOR SEPARATION OF GASES

Homer Duggan, Mimico, Ontario, and Ivan R. McHaffie, Montreal West, Quebec, Canada, assignors to The Grasselli Chemical Company, Cleveland, Ohio, a corporation of Delaware Application October 18, 1933, Serial No. 694,142
In Canada August 24, 1933

4 Claims. (Cl. 257—228)

This invention relates to the separation of gases and especially to an apparatus for the separation in a liquid state of one of the constituents of a gaseous or vaporous mixture. The invention describes a combined heat interchanger and liquefier which within a single unit permits the necessary heat interchange to take place both from regenerative and refrigerative cooling, to cool down a gaseous or vaporous mixture, a portion of which is liquefiable within the range of temperatures employed and to separate the liquefiable portion by causing condensation, during which the latent heat of vaporization of the liquefiable portion is removed.

The liquefiable portion is removed as condensate through special means provided for that purpose and so designed as to ensure complete separation of the liquid and removal of spray or entrained mist in the cooled gases.

The residual gases leave the unit at substantially the same temperature as that at which the gaseous or vaporous mixture enters the apparatus.

The mixture of gases to be separated makes three complete passes through the interchanger, the first two being under pressure, the final passage being at a pressure only slightly above atmospheric. Heat exchange takes place during each of the three passages of the gas mixture and provision is made in the heat exchange surface to compensate for the difference in heat transfer coefficients between gases under high and under low pressures.

In separating a constituent portion of a mixture of gases or vapors, such mixture enters the interchanger at a pressure above atmospheric and at a temperature preferably at or below atmospheric temperatures.

During the first passage of the mixture through the heat interchanger, the gases are cooled while under pressure and the liquefiable portion is condensed and separated out. Regenerative cooling is carried out by the unliquefied portion of the gaseous mixture still under pressure, travelling during its second passage through the interchanger counter currently to the incoming gas and in heat interchange with it. Refrigerative cooling is obtained by permitting the unliquefied portion of the gas still under pressure, after it has been brought to substantially the same temperature as the incoming gas by the regenerative portion of the interchanger, to expand to atmospheric pressure through an expansion engine or turbine where it does work thus removing heat and lowering its temperature.

This expanded gas at a low temperature and at atmospheric pressure is then caused to pass through the heat interchanger a third time, counter currently to the incoming gas and in heat interchange with it.

The design of the triple pass is such that the incoming gaseous mixture entirely surrounds the surface through which the regenerative portion of the heat interchange takes place, and is in turn entirely surrounded by the surface through which the refrigerative portion of the heat interchange takes place, so that the regenerative cooling is carried out simultaneously with the refrigerative cooling.

In operating apparatus of the type described, temperatures considerably below atmospheric are obtained and it is, therefore, necessary that means be provided for eliminating stresses due to expansion and contraction with changes in temperature. This is achieved according to our invention by separately supporting the upper and lower portion of our combined heat exchanger and liquefier and by providing expansion means for the outer casing connecting the upper and lower portions.

In separately supporting the upper and lower portions we support either one of the two by floating means, such as a counter weight arrangement, springs or other equivalent means. The expansion means for the outer casing may be a slip joint which can be made air tight by a stuffing box or we can provide the casing with corrugations or a diaphragm joint, etc.

A preferred manner in which this is accomplished is disclosed as an inherent part of the method of mounting and supporting the unit. The interchanger is set up so that the gas passages are vertical, and is suspended from rigid supports attached near the top. The bottom of the interchanger is supported from the end of levers, whose fulcrums are fixed points, and counter weights are attached to the other ends of the levers to balance the suspended weight of the unit while permitting sufficient vertical movement to compensate for changes in length of the interchanger due to increase or decrease of temperature. Relative changes in length between the interior parts of the unit, which are tubes, and the outer casing, are provided for by making the casing discontinuous and inserting a slip joint, which may be made gas tight at the top end.

A gas tight joint is used, when liquid refrigerants such as ammonia, sulphur dioxide, methyl chloride, carbon dioxide, or other gas or liquid refrigerants are employed and where it is necessary to recover the refrigerant used or the unliqueflable portion of the gas.

No mechanical loads can, therefore, be transmitted by the outer casing and are instead taken care of by means of the levers and counter weights described above.

Our invention will be more readily understood from a consideration of the accompanying drawing which represents a preferred form of apparatus. It is to be understood, however, that this is illustrative rather than limitative.

In the drawing: Figure 1 shows an elevation, partly in section, of the apparatus, and Figure 2 is a similar view showing the gauze cylinder (13) and associated elements on an enlarged scale.

Referring to the drawing a multiplicity of tubes (1) of suitable dimensions to withstand the desired pressure, and of such a size as to give the required rate of heat transfer, which can be calculated in a known manner, have their ends inserted into top header plate (2) and bottom header plate (3) and expanded to make gastight joints. A unique feature of the invention is that these tubes form the only rigid connection between the top header plate (2), and the bottom header plate (3).

Chamber (4) of suitable dimension to withstand the desired pressure, is attached to header plate (2), and surrounds the upper open ends of the tubes (1). The gases of which a portion is to be removed by liquefaction are introduced under pressure through an inlet connection (5) to this chamber and thence pass downward through the multiplicity of tubes (1). A second elongated chamber (6), which serves as a reservoir to collect the liquefied component is fastened to the bottom of header plate (3), and surrounds the lower open ends of tubes (1). A third chamber (7), having an outlet connection (8), is placed above chamber (4), and separated from it by a header plate (9) to which chamber (7) is attached. Passing through each of the tubes (1) are a plurality of smaller tubes (10), whose upper ends are inserted into header plate (9), and expanded to make a gas-tight joint, and whose lower ends project a suitable distance into chamber (6).

In one arrangement of the apparatus, three tubes (10) are conveniently passed through each of tubes (1). The projecting ends of tubes (10) are brought together in chamber (6) and fastened into a ferrule (11), secured in the center of a disc (12). A gas and liquid tight joint is made where the ends of tubes (10) pass through the ferrule (11). Ferrule (11) preferably projects below disc (12), which is centrally located in chamber (6) leaving an annular space, between the edge of the disc and the wall of the chamber of such an area, that the velocity of the gas passing through it, will not be sufficient to cause formation of spray.

A downwardly directed peripheral flange (22) is attached to the underside of the disc (12) to prevent the condensate from flowing along the underside of the disc and into the ferrule ends of tubes (10), and thus being carried upwards with the gas stream.

The bottom ends of tubes (10) are open so that gases entering chamber (6) from the larger tubes (1) may leave the chamber and pass upwardly through the tubes (10) counter currently to and in heat interchange with down-coming gases in tubes (1).

A cylinder (13), composed of several layers of fine mesh gauze is attached to the edge of disc (12), surrounding the projecting portions of tubes (10), and the open ends of tubes (1), and touches but need not be fixed to the bottom surface of plate (3).

The gases and liquid issuing from tubes (1) are deflected by disc (12) and pass through gauze (13), which serves to separate from the unliquefied gases any spray or entrained mist, which would otherwise be carried in a very finely divided state around disc (12) and up through tubes (10).

The unliquefied gases leaving chamber (6) flow upwardly through tubes (10) and absorb heat from the descending gases surrounding them in tubes (1), reaching chamber (7) still under pressure and at a temperature substantially equal to that of the gases entering the unit at (5). Leaving chamber (7) through outlet connection (8), these gases are then expanded entirely apart from the unit through an expansion engine or by other known means (not shown) to approximately atmospheric pressure and caused to do work, thus reducing them to a temperature below the liquefaction temperature of the constituent to be separated from the original mixture. The expanded gases at low temperature, enter the chamber formed by the outer casing (15), at inlet (16), and are then brought into contact with the outer surfaces of tubes (1) and absorb heat from the descending gases within the tubes, thus accomplishing refrigerative cooling.

Other cooling media can be used in outer casing (15) to accomplish this object. For example, liquid refrigerants such as ammonia, sulphur dioxide, methyl chloride, carbon dioxide, refrigerated brine may be employed but we prefer to use the gases leaving chamber (7) in a manner above described.

Since the gas mixture within tubes (1) is under pressures considerably above atmospheric and since the gases passing through casing (15) around the outside of tubes (1), are substantially at atmospheric pressure it is necessary to compensate for the difference in heat transfer coefficients, and in order to accomplish this, an extended surface (14) is provided on the outside of tubes (1).

The outer casing (15), surrounding the extended surfaces (14) attached to tubes (1), confines and assists in directing the flow of the gases under atmospheric pressure, the direction of the flow being from inlet (16) at a point closest to that at which liquefaction occurs to outlet (17) at the opposite end of the casing.

As a further means of directing the flow of gas transversely across tubes (1), a series of baffles (18) is affixed to the inside of casing (15), these baffles being so spaced as to give proper gas velocity over the extended surface for the required heat transfer and to provide that the flow of the gases from bottom to top of casing is sensibly counter current to that of the down coming gas within tubes (1).

The outer casing (15) is rigidly attached to the bottom header plate (3), but is not directly attached to the top header plate (2). A groove is formed on the underside of header plate (2) by rigidly attached angles (19) or by other means, and the upper end of casing (15) fits into said groove and is free to move therein. This groove may be made gas tight by means of packing held in place by means of a gland, if it is desirable to recover the refrigerants used as mentioned above.

The slip joint so formed provides for the relative movement of casing (15) due to the expansion or contraction, with changes of temperature, of tubes (1), which are rigidly connected between the header plates 2 and 3.

In the form of equipment shown in the drawing the unit is suspended in a vertical position from header plate (2) fixedly attached to support (20), on a suitable framework. To relieve the walls of tubes (1) of the load imposed by the suspended portion of the unit, while at the same time permitting expansion and contraction, the bottom header plate (3) is supported by a series of levers and counterweights (21) or by springs or other known means.

The apparatus above described finds numerous applications in the separation of gases and vapors. One process in which it has been employed comprises the recovery of sulphur dioxide from gases containing relatively small proportions of the same, as described in Canadian Patent No. 326,913.

Other processes in which this equipment could be employed are, for example, the separation of chlorine in mixtures of 10% by volume of chlorine in air, ammonia in 8% ammonia in nitrogen-hydrogen mixtures;—gasoline in 6% "gasoline" in casing head gas;—hydrocarbons in 10% hydrocarbons in gas from the cracking of oil, etc.

We claim:

1. An apparatus for the separation of gases or vapors by liquefaction comprising an upper plate member connected by a plurality of tubes to a lower plate member, a casing surrounding said tubes and connected to said upper and lower plates to form a gas chamber, means for allowing said casing to expand and contract under variations of pressure and temperature, a lower chamber at the underside of said lower plate and surrounding the lower openings of said connecting tubes, a first upper chamber on the upperside of said upper plate and surrounding the upper openings of said connecting tubes, said connecting tubes forming thereby a passage for gases between said first upper chamber and said lower chamber, a second set of tubes extending through said first upper chamber and through said connecting tubes and opening into said lower chamber, a second upper chamber surrounding the upper openings of said second set of tubes, said second set of tubes forming thereby a passage for gases between said lower chamber and said second upper chamber, one of said plates being rigidly supported, the other plate being floatingly supported in respect to said rigidly supported plate, so as to compensate for differences of length of said first connecting tubes due to contraction and expansion at different temperatures.

2. An apparatus for the separation of gases or vapors by liquefaction comprising an upper, rigidly supported plate member, connected by a plurality of tubes to a lower plate member, a casing consisting of a member on the underside of the upper plate and a member on the upper side of the lower plate, said members connecting through a slip joint and cooperating with said plates to form a chamber surrounding said connecting tubes, a lower chamber at the underside of the lower plate and surrounding the lower openings of said connecting tubes, a first upper chamber on the upper side of said upper plate and surrounding the upper openings of said connecting tubes, said tubes forming a passage for gases between said first upper chamber and said lower chamber, a second set of tubes extending through said first upper chamber and through said first connecting tubes and opening into said lower chamber, a second upper chamber surrounding the upper openings of said second set of tubes said second set of tubes forming a passage for gases between said lower chamber and said second upper chamber, said lower plate being floatingly supported by counter-balancing means to compensate for differences of length of said first connecting tubes due to contraction and expansion at different temperatures.

3. An apparatus as per claim 1 in which the openings of the first connecting tubes in the lower chamber are surrounded by a straining device and the second set of tubes extends into the body of said lower chamber beyond said straining device so that the gases and vapors delivered into the lower chamber by said first connecting tubes must pass through said straining device before entering the lower ends of said second set of tubes.

4. An apparatus as per claim 2 in which the slip joint between the extensions on the upper and lower plates is made gas tight.

HOMER DUGGAN.
IVAN R. McHAFFIE.